United States Patent [19]

Bikson et al.

[11] Patent Number: 5,026,479
[45] Date of Patent: Jun. 25, 1991

[54] FLUIDS SEPARATION DEVICE

[75] Inventors: Benjamin Bikson, Brookline; Salvatore Giglia, Norwood, both of Mass.

[73] Assignee: Union Carbide Industrial Gases Technology Corporation, Danbury, Conn.

[21] Appl. No.: 479,475

[22] Filed: Feb. 13, 1990

[51] Int. Cl.$^5$ .............................................. B01D 63/04
[52] U.S. Cl. .............................. 210/321.8; 210/321.89; 210/500.23
[58] Field of Search .................... 55/16, 158; 210/640, 210/321.72, 321.79, 321.8, 321.81, 321.88, 321.89, 500.23

[56] References Cited

U.S. PATENT DOCUMENTS

| | | |
|---|---|---|
| 3,228,876 | 1/1966 | Mahon .................................. 210/22 |
| 3,422,008 | 1/1969 | McLain ................................ 210/22 |
| 3,455,460 | 7/1969 | Mahon et al. ....................... 210/321 |
| 3,499,062 | 3/1970 | Geary, Jr. et al. ................... 264/36 |
| 3,536,611 | 10/1970 | DeFillipi et al. .................... 210/22 |
| 3,690,465 | 9/1972 | McGinnis et al. .................. 210/321 |
| 3,691,068 | 9/1972 | Cross ..................................... 210/22 |
| 3,755,034 | 8/1973 | Mahon et al. ...................... 156/169 |
| 3,794,468 | 2/1974 | Leonard .............................. 23/258.5 |
| 3,872,014 | 3/1975 | Schell .................................... 55/158 |
| 4,380,460 | 4/1983 | Otstot et al. .......................... 55/158 |
| 4,622,143 | 11/1986 | Edwards ........................... 210/321.1 |
| 4,623,460 | 11/1986 | Kuzumoto et al. ............. 210/321.1 |
| 4,652,373 | 3/1987 | Trimmer ........................... 210/321.1 |
| 4,781,834 | 11/1988 | Sekino et al. ................... 210/321.83 |

FOREIGN PATENT DOCUMENTS 0226431 6/1987 European Pat. Off. .
1260024 1/1972 United Kingdom .

Primary Examiner—Frank Sever
Attorney, Agent, or Firm—Alvin H. Fritschler

[57] ABSTRACT

A fluid separation device comprising an annular hollow fibers bundle in a shell having four ports, a fluid entrance port, a sweep fluid entrance port, a nonpermeate exit port and a sweep fluid-permeate exit port, wherein said bundle is encased in an essentially nonpermeable film barrier.

5 Claims, 3 Drawing Sheets

FLUIDS SEPARATION DEVICE

FIELD OF THE INVENTION

This invention relates to a hollow fiber membrane device or apparatus for the separation of a fluid component from a mixture of fluids. The term mixture of fluids as used herein refers to a mixture of liquids or a mixture of gases. More particularly it pertains to a fluid separation device that permits efficient use of a sweep fluid on the permeate side of the membrane.

DESCRIPTION OF THE PRIOR ART

Numerous disclosures exist on the various types of devices used for separating fluid mixtures with hollow fiber membranes. In most fluid separations essentially only three streams are present, a feed stream, a permeate stream and a nonpermeate stream. Thus the permeator will require a total of only three entry and exit ports; however, four ports are occasionally used and the permeate is extracted from two separate ports. In some instances, introduction of a fourth stream is beneficial to overall membrane separation operation, e.g., introduction of a sweep fluid stream. This necessitates the need for another entry port in the permeator, but merely adding another port is not the complete solution. For the separation process to benefit from the introduction of sweep fluids, rigorous flow dynamic conditions have to be maintained in the permeator to fully reap the benefits sought. The use of a permeate side sweep fluid stream is beneficial, for example, in gas separations where a very high separation factor exists and the faster permeating component may build up to a limiting permeate partial pressure. A high permeate partial pressure of the fast gas will limit the permeation and separation potential of the membrane module. Introduction of a permeate side sweep fluid stream that has low fast gas partial pressure reduces the partial pressure of the faster permeating component in the permeate stream, allowing the feed gas to be more thoroughly stripped of the fast gas.

This problem is of significant importance, for example, in gas dehydration processes. It is known that water vapor generally permeates faster through separation membranes than most other gases and thus dehydration can be effectively carried out by permeation through membranes. However, many of the known devices cannot remove the moisture without substantial product loss and fast enough, thus improvements are continuously being sought. The fluid separation device of this invention shows unexpected and substantially improved performance results in gas permeation processes with a sweep gas, such as drying processes. In some instances, the moisture content in air subjected to membrane drying with a dry sweep gas is reduced to several parts per million by volume (ppmv), or less.

The four-port permeators are generally known in the art and are frequently utilized in membrane separations. The four-port permeator configuration is essential, for example, for effectiveness of a dialysis process that requires introduction of dialyzate fluid. The dialysers are generally bore-side feed permeators with sweep fluid introduced on the shell side through entrance and exit ports located next to the tubesheets. This configuration is also disclosed for gas separations with permeate sweep, for example, U.S. pat. no. 3,499,062, further discussed below. While useful for small-size liquid separations, this configuration is not optimal for gas separation processes that require introduction of a sweep gas. The sweep gas will have a tendency to channel and by-pass a portion of hollow fibers in the bundle, leading to a decrease in the efficiency of the process.

Radial flow hollow fiber permeators of four-port configuration are also well known in the art as seen from the references discussed hereinafter and are utilized in liquid separations, such as reverse osmosis, and in gas separations. The radial flow four-port permeators are typically operated with the feed being introduced on the hollow fiber shell side and the permeate extracted through both ends of hollow fibers encapsulated in tubesheets. The radial flow design is intrinsically undesirable for gas separations, particularly for gas separation with permeate sweep. The flow dynamics in such permeators is of a cross-flow type; namely, the flow direction of fluid in the bore of the fibers is generally at right angles to the direction of flow of fluid over the external surfaces, which is inferior in performance to countercurrent flow configuration.

U.S. Pat. No. 3,228,876, issued Jan. 11, 1966 to H. I. Mahon, discloses a permeator comprised of a multiplicity of bundles of hollow fibers, the bundles and fibers arranged in a substantially parallel configuration. The permeator contains three ports, one entry port and two exit ports (one each for the permeate and nonpermeate). The permeator is essentially of radial flow design and cannot be utilized for permeations that utilize sweep fluids.

U.S. Pat. No. 3,433,008, issued Jan. 14, 1969 to F. A. McLain, discloses a permeator comprised of a spirally wrapped bundle of hollow fibers wound on an inner core. This reference discloses essentially three-port modules of radial flow design and does not disclose the use of an impervious barrier around the bundles of hollow fibers to direct the flow in a countercurrent direction nor the use of a sweep fluid in the separation process.

U.S. Pat. No. 3,455,460, issued July 15, 1969 to H. I. Mahon et al., discloses a hollow fiber membrane cartridge that contains at least one essentially parallel longitudinal tubesheet. This tubesheet, disposed longitudinally to the core, has holes drilled radially inwardly from the outer peripheral surface of the tubesheet to expose cut hollow fiber ends and to allow fluid into or out of said hollow fibers. The patent primarily is concerned with decreasing bore flow resistance by shortening fiber length. The permeator is essentially of three-port design and is not useful for permeation processes with sweep fluids.

U.S. Pat. No. 3,499,062, issued Mar. 3, 1970 to J. E. Geary, Jr., et al., discloses four-port permeators comprised of a multiplicity of parallel hollow fibers encased in and radially constrained by an elongated porous sheath member to make an encased group or bundle. A plurality of the encased bundles is then encased in a sheath, and this structure is employed in construction of the permeator or module of the patent, the permeator being illustrated by FIGS. 1, 13, 14, 15, 16, 17 and 18 of the reference. The patentees use the sheath to constrain the parallel hollow fibers and, as stated in column 6, lines 2 to 4, it is preferably a circular knit fabric sleeve of suitable material such as cotton thread. The patent does not disclose the use of a core tube in the center of the hollow fiber bundle and the use of an impervious barrier encasing the bundle for optimal flow configuration.

U.S Pat. No. 3,536,611, issued Oct. 27, 1970 to R.P. DeFillipi, et al., relates to a membrane separating device comprising a woven net of capillary tubes arranged around a central perforated distributor tube; the capillary tubes are arranged in a parallel configuration. The device requires the use of the woven mat and is primarily employed for the separation of liquids and further discloses a liquid sweep stream to facilitate recovery of permeates. The patent does not disclose the use of an impervious barrier around the capillaries. The central distributor tube is perforated or porous throughout its entire length and thus only radial flow configuration is feasible with this type of permeator.

U.S. Pat. No. 3,690,465, issued Sept. 12, 1972 to P. R. McGinnis, et al., relates to elements for separation of fluid mixtures that comprise layers of substantially parallel hollow fibers separated by thin foraminous materials that are detached from the hollow fibers over the entire effective surface of the fibers and then wound around a porous center tube. This arrangement is then encapsulated at each end to form resinous tubesheets in the conventional manner. These are assembled three-port permeation devices as shown in FIGS. 13 and 14 of the reference. The reference does not mention the use of an impervious barrier around the formed bundle of the parallel hollow fibers and the separation layer of the foraminous material. The reference is limited to a radial flow three-port permeator that cannot be utilized in permeations with sweep fluids.

U.S. Pat. No. 3,691,068, issued Sept. 12, 1972 to R. A. Cross, pertains to dialysis membranes made of polysulfone polymers. The membranes can be flat films or hollow fibers arranged in parallel. The hollow fiber permeator construction, as described in FIG. 3 and column 5, lines 11 to 36, does not include a center core tube and does not disclose the use of an impervious barrier around the bundle of parallel fibers.

U.S. Pat. No. 3,755,034, issued Aug. 28, 1973 to H. I. Mahon, et al., relates to a process for making a hollow fiber separatory element by preparing a belt of fibers by winding hollow fibers transversely around a pair of moving guide members while simultaneously applying a solidifiable resin adjacent to one end of the bundle of hollow fibers. After a bundle of sufficient size is formed, the process is stopped to remove the bundle and the resin is cured. The process requires formation of a belt of hollow fibers, winding the belt to form the bundle, preferably winding about a hollow, perforated core and forming a tubesheet face on at least one end of the bundle. The permeators of this invention are essentially of the radial type. The patentees do not fully disclose the construction of a permeator module, nor do they refer to the use of fiber bundle encased with an impervious barrier to allow for optimal flow configuration in the permeation process with the use of a sweep stream during the permeation process.

U.S. Pat. No. 3,794,468, issued Feb. 25, 1974 to R. J. Leonard discloses a helically wound bundle. The ends of the wound bundle are encapsulated in a tubesheet and cut to open the bores of the fibers; the bundle is then encased in a shell to form the permeator module with the appropriate manifolds. In the process a first fluid is passed through the interior bores of a hollow fiber membrane and a second fluid is passed around the exterior surfaces of the hollow fibers. The reference does not suggest or disclose the use of an essentially impervious barrier around the wound bundle to control the flow of fluid around the exterior surfaces of the hollow fibers.

U.S. Pat. No. 4,380,460, issued Apr. 19, 1983 to R. S. Otstot, et al., discloses a permeator module in which the hollow fibers are in parallel alignment extending the length of the shell of the encasing vessel. The patent is primarily concerned with the use of a resilient slit tube to protect the hollow fibers during shipment and while being inserted into the shell. The resilient slit tube is free of restraint after the bundle of hollow fibers has been inserted in the encasing vessel such that it expands into contact with essentially the entire inner surface of the shell of said vessel. As stated in column 3, lines 50 to 52, the possibility of leakage or flow of fluid between the shell and the slit tube is essentially nonexistent. In contrast, the permeator module of the instant invention uses an impervious barrier around the bundle, which is in contact with and encases the hollow fibers membrane cell and is spaced away from the shell of the encasing vessel so as to permit flow between the shell wall and the film wrap. It is also to be noted that the permeator of this reference is essentially of three-port design and is not useful for a permeation process that utilizes a sweep stream.

U.S. Pat. No. 4,622,143, issued Nov. 11, 1986 to D. W. Edwards, discloses a modified double-ended (DE) permeator comprised of a tubular bundle of parallel hollow fibers encased by a shell and end plates. The permeator disclosed is of a radial flow configuration that is not useful for permeations with sweep streams and is different from the permeator of this invention. The permeator is of a three-port design with the novel feature of extracting the permeate from both ends of the fiber bundle and discharging at one end of the permeator only.

U.S. Pat. No. 4,623,460, issued Nov. 18, 1986 to H. Kuzumoto, et al., discloses a three-port fluid separation unit where the hollow fibers are in parallel alignment. The reference is limited to hollow fiber modules of radial flow configuration, which are outside the scope of this invention.

U.S. Pat. No. 4,652,373, issued Mar. 24, 1987 to J. L. Trimmer, discloses a bundle of hollow fibers helically wound on a hollow core with each of the fiber lengths passing through a tubesheet that is drilled with a hole pattern which cuts through all of the hollow fibers. The bundles are used to construct a three-port permeator separation unit, said unit essentially of radial flow. The bundle is not encased by an impervious barrier. This patent reference does not show the use of a sweep stream during the fluids separation process.

U.S. Pat. No. 4,781,834, issued Nov. 1, 1988 to M. Sekino, et al., discloses a three-port permeator module comprising a hollow fiber package body in a cylindrical shape around a core pipe, the said pipe having a plurality of holes at one end. The hollow fibers membrane package is covered with a nonpermeable film except for the portion that is opposite to the end of the core pipe having the plurality of holes. The nonpermeable film is further covered with a reinforcing support material with the entire covered fibers assembly being encased in a shell to form the three-port permeator. The permeator is of three-port design, and there is no provision for introduction of a sweep stream, nor any discussion concerning the use of a sweep stream.

British Patent Specification 1 260 024, published Jan. 12, 1972, discloses a three-port permeator module comprising hollow fibers in a parallel or longitudinal alignment. The module is constructed to contain a perforated tube within the bundle of hollow fibers to provide an exitway to the fluid rejected by the hollow fibers. Radial flow is the preferred mode of operation. There is no mention of use of a sweep flow. Though a sleeve is used for ease of insertion of the hollow fiber bundle into the shell, it encloses the entire bundle and is comprised of a pervious material.

European Patent Application 0 226 431 A2, M. J. Coplan inventor, published Jun. 24, 1987, describes a three-port hollow fiber separatory module in which the hollow fiber bundle is encased in an impervious barrier over essentially its entire length except for a portion opposite the end where the fluid retentate exits the module. The reference has no provision for introduction of a sweep stream into the module.

Among all of the references discussed, U.S. Pat. No. 3,794,468 is the only patent disclosing a module having at least four ports and a spiral or helical winding of the hollow fibers. However, it does not suggest or include the use of a tight fitting impervious barrier around the bundle of hollow fibers for optimal flow configuration. Neither do any of the other references that disclose four-port modules.

It is thus the object of this invention to provide a hollow fiber permeator of improved flow dynamic performance for gas separation operations with permeate gas sweep. The permeators of this invention provide for fluid permeation with permeate sweep in an axial flow relationship with feed fluid, wherein the problem of bypass flow can be overcome.

SUMMARY OF THE INVENTION

This invention relates to a hollow fiber membrane fluid separation device or permeator. The device comprises a shell enclosing an annular hollow fiber bundle. A helically wound hollow fiber membrane bundle or cartridge is the preferred bundle. The permeator contains four entry and exit ports, a fluid feed entrance port, a nonpermeate exit port, a sweep fluid entrance port, and a sweep fluid-permeate exit port. The hollow fiber membrane bundle contains a center core tube with hollow fibers placed in a cylindrical shape around the tube. Preferably the hollow fibers are helically wound around the center core tube. The center core tube has perforations or holes at only one end as fully discussed below. The outer surface of the hollow fiber membrane bundle is tightly encased in an essentially nonpermeable barrier material placed around essentially the entire longitudinal length of the bundle, except for a narrow uncovered portion at one end of the bundle to permit flow of fluid into or out of the bundle of hollow fibers and contact the exterior surfaces of the hollow fibers. The two ends of hollow fiber membrane bundle are encapsulated in tubesheets with the center core tube extending or opening out through at least one of the two tubesheets to permit flow of a first fluid stream out of the center core tube and a second fluid stream out of the open bores of the hollow fibers embedded in one tubesheet, and a third fluid stream into the open bores of the hollow fibers embedded in the second tubesheet. The center core tube has holes between the tubesheets at the end opposite the uncovered end of the hollow fiber bundle to permit flow of fluid between the inner core of the tube and the exterior surfaces of the annular hollow fiber bundle. The assembled hollow fiber membrane bundle is positioned in the shell to form the fluids separation device or module of this invention. As constructed said bundle is positioned in the shell to provide an annular spacing around the periphery of the exterior surface of said bundle and the interior surface of said shell to permit flow of fluid therebetween. All of the above is hereinafter described in more detail.

THE DRAWINGS

DETAILED DESCRIPTION OF THE INVENTION

This invention provides a hollow fiber fluid separation device or permeator which can efficiently employ the use of a permeate side sweep fluid in a fluid separation process. The term "sweep fluid" having an established meaning in the art; it is also often referred to as the "purge fluid." The fluid separation device contains four ports in the shell for the entry and exit of the fluid streams. An important feature of this fluid separation device is the presence of an essentially nonpermeable barrier that encases the bundle of hollow fibers so as to essentially prevent bypass of fluids in the encased section and to allow for efficient axial flow configuration.

The fluid separation device, as assembled, consists of the shell and annular hollow fiber membrane bundle or cartridge housed therein. The shell can be cylindrical, or any other geometric shape, and contains four ports for the entry and exit of fluid streams. A first port for entry of the fluid feed stream, a second port for the entry of the permeate side sweep fluid stream, a third port for the exit of the nonpermeate stream and a fourth port for the exit of the sweep fluid-permeate stream.

Figure 1:
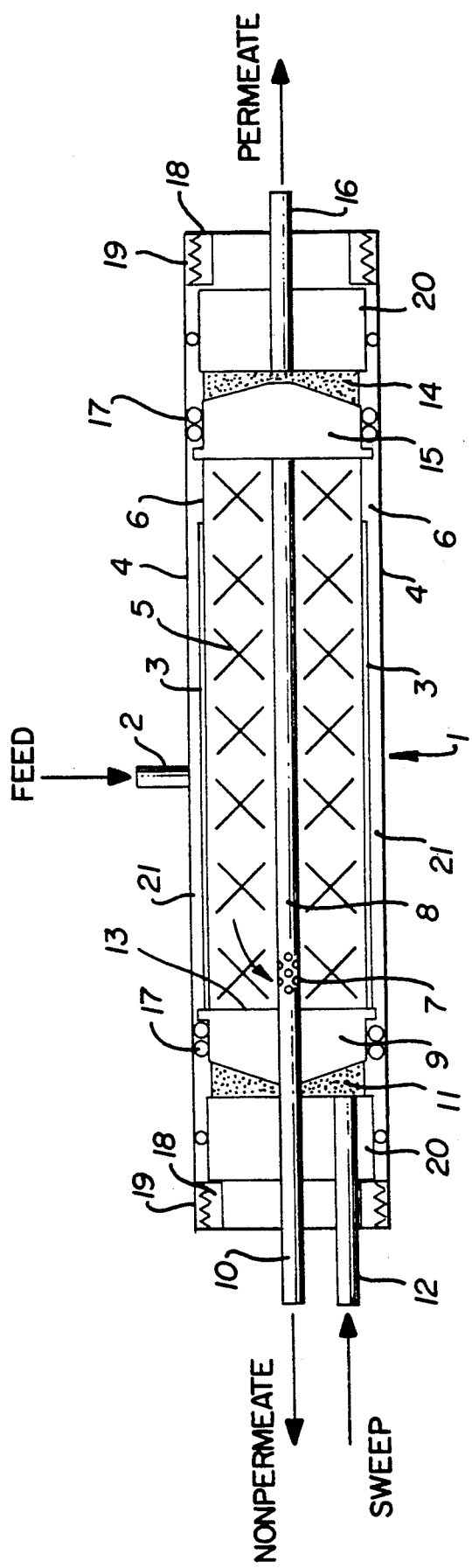
FIG. 1 is a sectional view of an embodiment of a fluids separation device in accordance with the present invention wherein feed fluid is introduced on the hollow fiber shell side.
Figure 2:
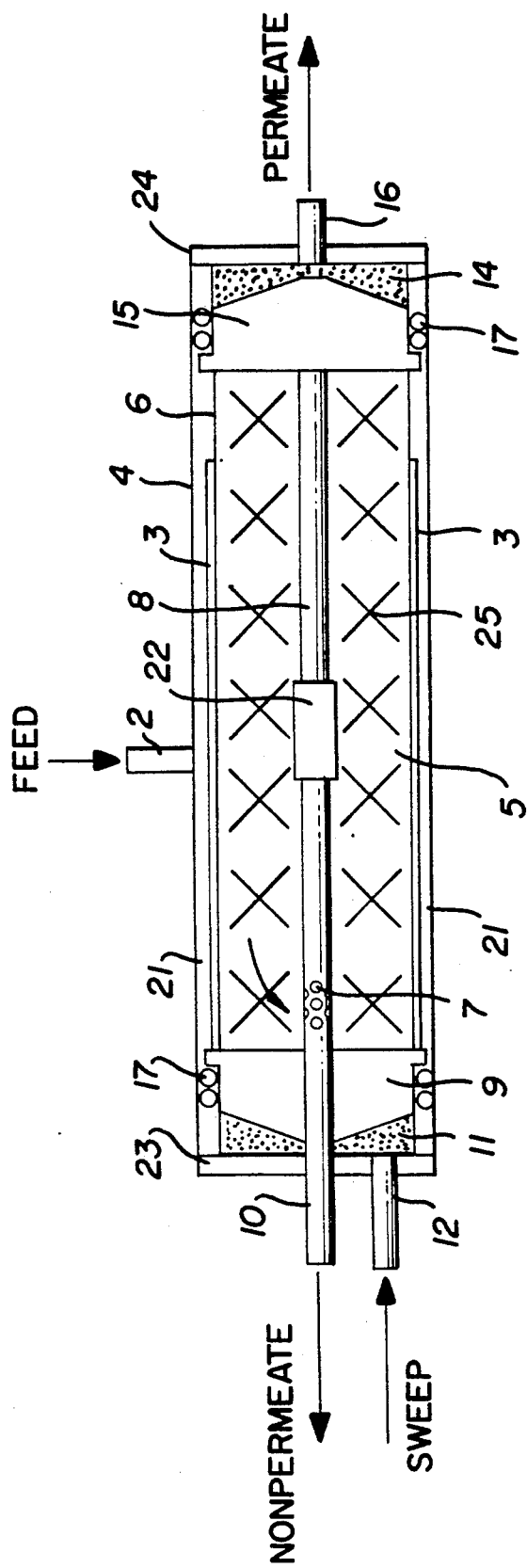
FIG. 2 is a sectional view of another embodiment of a fluids separation device in accordance with the present invention.
Figure 3:
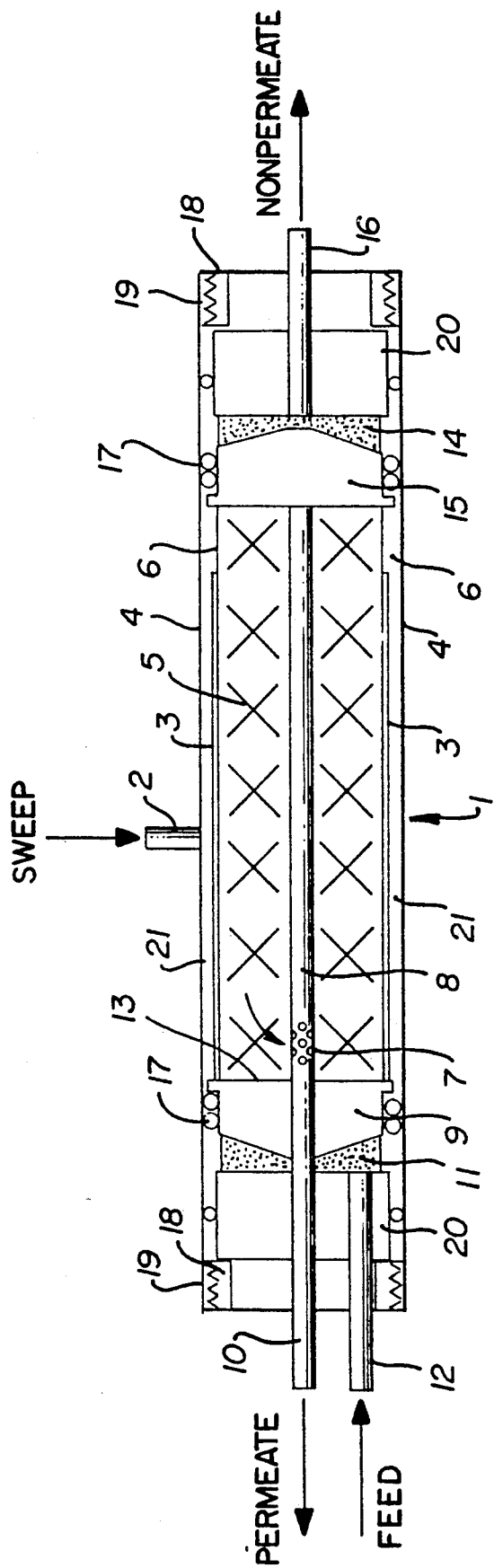
FIG. 3 is a sectional view of an embodiment of a fluids separation device in accordance with the present invention wherein feed fluid is introduced on the hollow fiber bore side.

The hollow fiber membrane bundle contains a center core tube, hollow fiber membranes arranged circularly around the tube, preferably helically wound around the exterior of the center core tube, and an essentially nonpermeable, preferably flexible, barrier comprised of one or more layers of thin film tightly wrapped around essentially the entire longitudinal length of the exposed hollow fibers of the bundle except for a narrow uncovered portion at one end of the bundle next to the tubesheet. Both ends of said bundle are encapsulated in tubesheets with the center core tube opening out of one tubesheet to permit the flow of fluid in or out of the center core tube. In some embodiments, the center core tube may be constructed with an opening out of both tubesheets, providing an additional exit port for shell side fluid. The tubesheets are severed, the bores of the hollow fibers are opened and the hollow fiber ends positioned in communication with two adjacent chambers, all as more fully described hereinafter. The core tube being disposed within the bundle is constructed and arranged such that its interior and the shell side of the permeator do not communicate with the chambers in communication with the open end of the hollow fibers. In FIGS. 1 through 3, the core tube is shown to be continuous and extending through the tubesheets; however, it is understood that the core tube can be constructed from several interconnected tubes in flow tight relationship provided by 0-rings or threads. Such arrangement might, sometimes, be advantageous for ease of installation. By the term "exposed hollow fibers" is meant the entirety of hollow fibers located between the inner surfaces of the two tubesheets.

The center core tube has openings or holes in the area adjacent to one of the tubesheets to permit flow of fluid between the exterior surface of the hollow fibers and the interior core of the center core tube. The size and number of these openings is dependent upon the size of the cartridge and gas flow velocity on the shell side; they are generally situated at the point from about one percent or less to a point up to about 25 percent of the longitudinal length between the two tubesheets. The openings can be in the form of drilled holes, cut slots or other perforations. The cross-sectional area occupied by the holes is essentially determined by pressure drop requirements and preferably kept to acceptable minimum cross-section and holes positioned adjacent to the tubesheet to insure optimum flow dynamics. For example, the perforated holes are placed in the core of the pipe or tube at the position of about one to 25 percent of the exposed hollow fiber length close to the edge portion of the fiber layer bonded with tubesheet resin. The center core tube can be of any geometrical configuration and made from any nonpermeable material, metal, glass, wood, plastic, composite laminate, and the like.

The essentially nonpermeable barrier of one or more layers placed around the hollow fiber bundle has to be in intimate contact with the exterior of the bundle throughout essentially the entire exposed hollow fiber length that is in contact with the barrier. The close contact is required to prevent channeling or bypassing of the active surface areas of hollow fiber membranes by the fluid stream. This arrangement can be accomplished through molding or deposition of liquid curable resin to the exterior of the bundle, the resin sometimes being further reinforced by an external shell or braid. In one embodiment of this invention, the impervious barrier is a thin plastic film that can be wrapped tightly around the bundle and conformed to bundle dimensions.

The essentially nonpermeable flexible film wrap or film barrier can be of any composition, for example, a thin film of a polyolefine or of polyvinylidene chloride. The impervious film can be, further, an impervious coating material applied from innocuous solvent. Alternatively the impervious barrier can be placed by shrinking a plastic shrink sleeve around the exterior surface of the bundle. It can be applied before the tubesheet is formed with one end embedded in the tubesheet, if desired, or it can be applied to the bundle of hollow fibers after the tubesheet has been formed. As indicated the flexible film wrap does not cover the entire surface of the bundle of hollow fibers. The end that is opposite to the end in which the holes are present in the center core tube a portion of the bundle of hollow fibers near the opposite tubesheet is left uncovered to provide for gas entrance or exit of fluids. This uncovered gap can be of variable width but generally is from about one percent or lower to up to about 25 percent of the longitudinal length between the two tubesheets, preferable from about one to five percent. For optimal flow dynamic performance, the gap should be kept to minimum dimensions, the dimensions further determined by minimum pressure drop requirements since an excessively narrow gap can induce severe pressure drop.

Hollow fibers to be utilized in the fluids separation device of this invention depend upon the particular separation process to be undertaken.

Their preparation and compositions are well known to those of ordinary skill in the art. Though most of the discussion in this document refers to composite membranes, one can use either a dense wall, porous, asymmetric or composite membrane in constructing the fluids separation device.

For maximum efficiency of the separation process, such as gas drying process, it is important that the permeating gases mix radially with the sweep gas without any axial mixing taking place, the axial mixing is also most undesirable on the feed side, while conditions on the feed side should be maintained to prevent concentration polarization. In practice, however, the radial mixing is frequently difficult to achieve with composite or asymmetric membranes because of the resistance to radial mixing by the porous support layer that typically impedes the radial mixing. This invention provides a permeator that uses composite membranes in which the porous support layer essentially does not prevent radial mixing on the permeate side of the membrane. In using the permeator of this invention, a counter-current flow is preferably maintained between the feed and the permeate and is critical and important for optimal performance. However, it should be noted that under some rare circumstance cocurrent flow might be suitable, but in essentially all instances countercurrent flow direction is the desired operating mode. Coupled with the countercurrent flow is the radial mixing in the porous substrate. However, axial mixing at either the feed or permeate side of the membrane is undesirable, as well as any channeling or bypassing of the gas flow in membrane modules.

The methods by which hollow fibers are wound around the center core mandrel are well established in the art, as are the methods and materials used to form the tubesheets and methods to sever the tubesheets to expose hollow fiber bores. In FIGS. 1 through 3, the hollow fibers are severed by cutting slots or notches in the tubesheets. However, the tubesheets can be severed by creating a flat surface by techniques known in the art.

It was found, surprisingly, that the fiber can be wound around the center core mandrel at angles of up to 20° and below, while the countercurrent flow behavior is still displayed by the permeator. A 0° angle is defined as perpendicular to the core tube. It would commonly be expected that for the countercurrent flow behavior to be displayed, the shell side fluid has to flow tangentially to the hollow fibers in a countercurrent arrangement. Thus it is most surprising that the hollow fibers can be arranged at a substantial angle to the shell side flow direction with countercurrent flow behavior still displayed by the permeator. The winding angles are frequently determined by pressure drop requirements on the bore side of the permeator. To decrease pressure drop of the fluid along hollow fiber bores, the fibers are frequently wound at angles of 45° and higher.

The production of permeable hollow fibers and the materials used for their production are well known. Such hollow fibers are readily produced by the procedure described by I. Cabasso, "Hollow Fiber Membranes", Kirk-Othmer: Enc. of Chem. Tech., 12. Third Ed., 492–517 (1980) and I. Cabasso, "Membranes". Enc. of Pol. Sc. & Eng., 9, Second Ed., 509–579 (1987), incorporated herein by reference. Many hollow fibers are known to the porous with channels for fluid flow existing between the exterior and interior surfaces of the hollow fibers. The pores generally have an average cross-sectional diameter less than about 200,000 Angstroms and in some porous hollow fibers the average pore cross-sectional diameter is less than about 50,000 or about 10,000 Angstroms; in some instances, the average pore cross-sectional diameter can be as small as about 5 to about 200 Angstroms. Depending upon the intended use (e.g., gas-gas, liquid-liquid, microfiltration, ultra-filtration, etc.) one selects hollow fibers having the appropriate pore diameter sizes.

Advantageously the walls of the hollow fibers are sufficiently thick so that no special apparatus would be required for their handling. The outside diameter of the hollow fiber can vary from about 1 mil or less to about 100 mils or more, preferably from about 2 mils to about 80 mils. The wall thickness of the hollow fiber can vary from about 0.1 mil to about 12 mils or more, preferably at least about 0.2 mil up to about 20 mils.

In order to provide a desirable flux through the porous hollow fiber, particularly those hollow fibers having walls at least about 2 mils in thickness, hollow fibers having a substantial void volume are beneficially used. Voids are regions within the hollow fibers that are vacant of the material of the hollow fibers. Thus when voids are present, the density of the hollow fiber is less than the density of the bulk material of the hollow fiber. The void volume of the hollow fiber can be as high as 90 percent, or from about 10 percent to 80 percent, and sometimes about 20 to 70 percent, based on the superficial volume, i.e., the volume contained within the gross dimensions of the hollow fiber, excluding the bore volume.

Any of the porous hollow fibers produced from known inorganic or organic materials can be used, however, organic materials such as the natural and synthetic polymers are preferred, including polymer blends and alloys, thermoplastic or thermoset polymers, preferably thermoplastic. Typical polymers can be substituted or unsubstituted polymers and may be selected from polysulfones; poly(styrenes), including styrene-containing copolymers such as acrylonitrile-styrene copolymers, styrene-butadiene copolymers and styrene-vinylbenzylhalide copolymers; polycarbonates; cellulosic polymers, such as ethyl cellulose, cellulose acetate; cellulose-acetate-butyrate, cellulose propionate, methyl cellulose, etc.; polyamides and polyimides; polyethers; poly(arylene oxides) such as poly(phenylene oxide); polyurethanes; polyesters (including polyarylates), such as poly(ethylene terephthalate), poly(alkyl methacrylates), poly(alkyl acrylates), etc.; polysulfides; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl esters) such as poly(vinyl acetate) and poly(vinyl propionate); polyphosphazines; etc.

In many instances the hollow fiber is in the form of a composite membrane with a thin membrane-forming material applied to the surface of the porous hollow fiber. This can be produced by any of the known procedures, e.g., as shown in U.S. Pat. No. 4,467,001, wherein a solution of the membrane-forming material is applied to deposit a finished dry coating up to about 7,000 Angstroms, preferably from about 500 to about 2,000 Angstroms adhered to the exterior surface of the porous hollow fiber. In some instances adhesion is prompted by coupling agents and/or chemical treatment.

Typical of the useful membrane-forming materials are polymers which can be substituted or unsubstituted. The materials include synthetic rubbers; natural rubbers; relatively high molecular weight and/or high boiling liquids; organic prepolymers; poly(siloxanes); polysilazanes; polyurethanes; poly(epichlorhydrin); polyamines; polyamides; acrylonitrile-containing copolymers such as poly($\alpha'$-chloroacrylonitrile) copolymers; polyesters (including polylactans and polyarylates), e.g., poly(alkyl acrylates) and poly(alkyl methacrylates), polysuccinates, and alkyd resins; cellulosic polymers; polysulfones; poly(alkylene glycols) such as poly(ethylene glycol), poly(propylene glycol), etc.; polymers from monomers having '-olefinic unsaturation such as poly(olefins), e.g., poly(ethylene), poly(propylene), poly(butadiene), poly (2,3-dichlorobutadiene), poly(chloroprene), poly(styrene) including poly(styrene) copolymers, e.g., styrene-butadiene copolymer, polyvinyls such as poly(vinyl alcohols), poly(vinyl aldehydes) e.g., poly(vinyl formal) and poly(vinyl butyral), poly(vinyl ketones) (e.g., poly(methyl vinyl ketone)), poly(vinyl esters) e.g., poly(vinyl benzoate)), poly(vinyl halides), poly(vinylidene halides); fluorinated ethylene copolymers; poly(arylene oxides); polycarbonates; and the like, and any interpolymers including block interpolymers containing repeating units from the above, and grafts and blends containing any of the foregoing, and monomers of the above-mentioned polymers.

The porous polysulfone hollow fibers used in the examples were spun from a ternary solution of commercially available polysulfone in a solvent/nonsolvent mixture known in the art using the procedures described by I. Cabasso et al. in "Composite Hollow Fiber Membranes", Journal of Applied Polymer Science, 23, 1509–1523 and in "Research and Development of NS-1 and related polysulfone hollow fibers for reverse osmosis desalination of seawater" PB248,666, prepared for the Office of Water Research and Technology, Contract No. 14-30-3165, U.S. Department of the Interior, July 1975. The well known tube-in-tube jet technique was used for the spinning procedure with water at about room temperature being the outside quench medium for the fibers. The quench medium in the center bore of the fiber was air. Quenching was followed by extensive washing to remove pore forming material. Following the wash, the hollow fibers were dried at elevated temperature and water was removed by passing the hollow fibers through a hot air drying oven.

The porous polysulfone hollow fibers produced were about 20 mils outside diameter and about 12–13 mils inside diameter and were produced from a polybisphenol-A ether sulfone (available commercially as polysulfone P 3500 sold by Amoco Performance Products) comprising a plurality of repeating units of the formula:

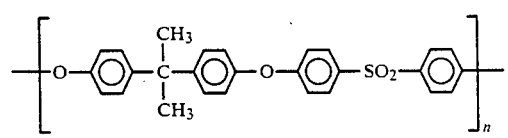

following a procedure similar to that described by I. Cabasso, supra. In this method, the porous polysulfone hollow fibers are basically isotropic and possess high levels of surface porosity most suitable for preparation of composite membranes. However, fibers prepared by dry-wet techniques do possess some gradation of porosity from interior to exterior of the fiber considered in the field to impart some asymmetric characteristics to the hollow fibers. These were coated with sulfonated poly(oxy-1,4-phenylene-sulfonyl-1,4-phenyleneoxy-1,4-phenylene[2,2,2-trifluoro-1-(trifluoromethyl) ethylidene]-1,4-phenylene (hereinafter F6-SPS), as shown in Examples 1 and 2 and sulfonated polyarylether sulfone (hereinafter SPS), as shown in Example 3, to prepare the composite hollow fiber membranes used to prepare the permeator of FIG. 1 configuration.

The porous polysulfone hollow fiber is coated with, in this instance, the sulfonated polysulfone semipermeable Coating material F6-SPS to form a composite membrane. This coating procedure can be carried out by any of the known methods, e.g., as shown in U.S. Pat. No. 4,467,001, incorporated herein by reference. A solution of the sulfonated polysulfone membrane-forming material F6-SPS is applied to the surface of the porous polysulfone hollow fiber to deposit a finished dry coating up to about 10,000 Angstroms, preferably from about 500 to about 7,000 Angstroms, most preferably from about 1,000 to about 3,000 Angstroms, adhered to the surface of the porous polysulfone hollow fiber.

FIG. 1 shows a sectional view of an embodiment of a fluids separation device of this invention, 1 designates the fluids separation device which comprises the shell 4, hollow fiber membrane bundle 5, center core tube 8, film barrier 3 and tubesheets 9 and 15. The figure also shows fluid feed stream entrance port 2, nonpermeate exit port 10, sweep fluid entrance port 12 and sweep fluid-permeate exit port 16. Also shown are holes 7 in center core tube 8, the uncovered portion 6 of hollow fiber membrane bundle 5, hollow fiber bore openings 11 and 14 in the form of slots or notches in the tubesheet, tubesheet face 13, 0-rings 17, threaded ring 18, threads 19, cylindrical plugs 20 and annulus spacing 21.

In practice in the use of the equipment illustrated by FIG. 1, the fluid feed stream enters the fluids separation device 1 via entrance port 2, which can be positioned in the pressure shell 4 at any point between tubesheets 9 and 15. An impermeable film barrier (for example, a thin film such as polyethylene or polyvinylidene chloride) 3 forces the fluid feed stream to travel along the annulus spacing 21 between the fluid separation device's pressure shell 4 and film barrier 3. The fluid feed stream initially comes into contact with the exterior surface of the hollow fibers membrane bundle 5 at the entrance region at uncovered portion 6, said hollow fiber membranes comprising, for example, a composite membrane of porous polysulfone hollow fibers having a very thin coating layer of the sulfonated polysulfone. The fluid feed stream flows along the exterior surface of the hollow fibers membrane bundle 5 and exits through extraction holes 7 of center core tube 8. Center core tube 8 extends through tubesheet 9 allowing the non-permeating fluid stream to leave the permeator at nonpermeate exit port 10. Sweep fluid enters the hollow fiber bore openings 11 via sweep fluid entrance port 12. The sweep fluid joins the permeate fluid at the tubesheet face 13, and flows cocurrently through the bores of the hollow fibers with the enriched permeate fluid and counter-currently to the feed (nonpermeate) stream. The permeate/sweep fluid mixture exits the hollow fiber bores at hollow fiber bore openings 14, the hollow fiber being embedded in tubesheet 15, and exits the permeator at sweep fluid-permeate exit port 16. O-rings 17 act as a fluid tight seal to separate the high and low pressure sides of the permeator, in essence also separating the fluid feed stream and nonpermeate from the sweep/permeate mixture.

When pressurized fluid feed is introduced on the shell side of the hollow fiber bundle, the pressure force acting against the backside of each tubesheet 9 and 15 tends to deflect each tubesheet if there is no balancing force on the front side. To prevent potential deflection of the tubesheets, a physical support in contact with the front side of each tubesheet is employed. In FIG. 1, a threaded ring 18 engages permeator pressure shell 4 by threads 19 (as described in U.S. Pat. No. 4,709,831) to retain cylindrical plugs 20 and counterbalance the pressure force. The sweep fluid serves to move the permeate out of the module and thus improves the separation process. It flows through the module in countercurrent direction to the feed and nonpermeate and cocurrent direction to permeate The sweep gas mixes with the permeate in essentially radial mixing fashion and exhibits essentially no axial mixing on the surface of the porous substrate. The sweep gas can originate from different sources, but must have concentration of the fast gas permeating component substantially below that of the permeating gas. For instance, in the gas drying process, it can be a previously dried gas or it can be a portion of the fluid recovered from the fluid separation device 1 through nonpermeate exit port 10 and recycled, by appropriate means, into the permeator via sweep fluid entrance port 12.

The entrance and exits of the fluid streams may be reversed. For example, fluid feed stream can be charged into port 10 with nonpermeate stream exiting at port 2, and sweep fluid stream entering at port 16 with permeate stream exiting at port 12.

A second embodiment of the fluids separation device is illustrated in FIG. 2. In this embodiment, a telescoping device 22 which is part of center core tube 8 allows the center core tube and, therefore, the hollow fibers membrane bundle 5, as a whole to compress or stretch to a desired length. The fibers 25 are wound at an angle and thus they may elongate or shorten in length to some extent without fiber breakage. Film barrier 3 is also composed of flexible material. This construction assures that when pressurized fluid enters the fluids separation device on the hollow fiber shell side, tubesheets 9 and 15 are in contact with and are supported by end closures 23 and 24. The end closures are fixed in position by means of snap rings, in a flanged design by bolts, or the like. All designations in FIG. 2 are otherwise the same as in FIG. 1.

The hollow fiber permeators of this invention can be employed interchangeably as shell side feed or bore side feed permeators. In bore side feed configuration, shown in FIG. 3, the feed fluid is charged into the hollow fiber bores via port 12 with nonpermeate stream exiting via port 16. The sweep stream is introduced via port 2 with the permeate stream exiting at port 10. All designations in FIG. 3 are the same as in FIG. 1.

The following examples serve to further illustrate the invention.

EXAMPLE 1

Part A. Preparation of Sulfonated F6-Bis A Polysulfone (F6-SPS)

One hundred twenty five g of F6-Bis A polysulfone (poly[oxy-1,4-phenylenesulfonyl-1,4-phenyleneoxy-1,4-phenylene-[2,2,2,-trifluoro-1(trifluoromethyl)ethylidene]-1,4-phenylene]) were dissolved in 1,250 ml of methylene chloride in a reaction flask equipped with a mechanical stirrer, thermometer, condenser and nitrogen inlet and outlet. The contents of the reaction flask were cooled to $-4°$ C. and 66.14g of chlorosulfonic acid dissolved in 337 ml of methylene chloride were added over a period of 45 minutes under nitrogen atmosphere at $-6°$ C. The reaction flask was brought to room temperature, circa 25° C., and the reaction mixture stirred for a total period of about 6 hours. The reaction was terminated, the methylene chloride was decanted, and the precipitate was washed with methylene chloride three times and dissolved in 1,000 ml of ethanol and rotoevaporated. One half of the dry rotoevaporated F6-SPS was dissolved in ethanol-water mixture and dialyzed using conventional cellulose dialysis bags, the dialyzate was rotoevaporated to dryness and dried in a vacuum oven at 70° C. to a constant weight. The thus prepared sulfonated F6-BisA-polysulfone (F6-SPS) had a DS of 0.84 and an ion-exchange capacity of 1.34 meq/g of dry polymer in $H^+$ form.

The term DS represents degree of sulfonation and is a measure of the extent of sulfonation in the polymer repeat unit, it can be the sulfonic acid group or its salified form. The ions forming the salified form of the sulfonic group can be the ammonium group, an alkali metal atom such as lithium, sodium, potassium, etc., an alkaline earth metal atom such as calcium, magnesium, etc., a transition metal atom (in particular zinc, copper, cobalt, nickel), or an organic salt forming group, for example, primary, secondary, tertiary, or quarternary amines; these forms being known to the skilled chemist. The degree of sulfonation can be from about 0.2 to about 2, preferably from about 0.4 to about 1.5. Thus, if one sulfonic acid groups is attached to each repeat unit in the polymer chain the degree of sulfonation is 1; if one sulfonic acid group is attached to an average of 5 repeat units in the polymer chain, the degree of sulfonation is 0.2.

Part B. Preparation of Composite Hollow Fiber Membrane

Composite gas separation membranes were prepared by coating porous polysulfone hollow fibers with a solution of the F6-SPS in ethanol. The coating solution was prepared by dissolving 1.25 g F6-SPS in 100 cc of reagent alcohol and then filtered through a 1.5 micron glass filter. The polysulfone composite membrane was prepared by passing the dry polysulfone hollow fibers through the coating solution bath essentially as described in U.S. Pat. No. 4,467,001. The solvent was evaporated by passing the fibers through a dryer oven at circa 65° C. with a residence time of 15 seconds.

Part C. Preparation of Permeator

A helically wound hollow fiber membrane permeator was constructed as follows: The hollow fiber cartridge was wound by the procedure described in U.S. Pat. No. 4,207,192 and the overall configuration of the permeator is shown in FIG. 1. In this permeator, the center core tube, extraction tube 8, extends through only one of the module's two tubesheets (either 9 or 15). The center core tube 8 is provided with extraction holes 7, which allow for removal or entrance of either the feed or permeate streams depending on whether the bore side or shell side feed mode is employed.

The module was produced using the composite hollow fiber membranes of Part B. The fibers had an outer diameter of about 16.6 mils and an inner diameter of about 11.3 mils. The module had a tubesheet, a potted length of about 10 cm and an active length of about 20 cm. The fiber was helically wound about the extraction tube at an angle of about 25° (a 0° angle is defined as perpendicular to the mandrel or core tube) so that the active fiber length was about 48 cm. The module, containing 19.6 square feet of active area, was encased in a plastic film barrier 3, except for a narrow gap of about ⅛ inch that was left between the film and the tubesheet to allow for gas entrance or exit, and pressure shell 4 to form permeator 1 of the configuration shown in FIG. 1. The composite sulfonated polysulfone (F6-SPS) membrane was post-treated in a conventional manner with a dilute solution of low molecular weight silicone in cyclohexane prior to permeation experiments.

Part D. Operation of the Permeator

The permeator of Part C was used to dehydrate an air feed containing approximately 2,300 ppmv of water vapor. The humid air feed was introduced into entrance port 2 at a pressure of 115 psia and a temperature of about 19° C. to 22° C. The sweep fluid comprised dehydrated air with about 1 ppmv of water vapor and it was introduced into the permeator via entrance port 12. The sweep fluid joined and diluted the water vapor enriched permeate gas in the bores of the hollow fibers and flowed concurrently therewith through the bores and countercurrent to the direction of the feed flow. This countercurrent operation allowed for the most efficient gas separation and the nonpermeated dehydrated air stream was recovered via nonpermeate exit port 10. This mode of operation was a shell-side feed mode and the results are those of runs 6 to 26, inclusive, of Table I.

The achievable degree of dryness of the nonpermeate gas depends in part on the flow rate of the sweep fluid. A greater volume of sweep fluid will cause a greater dilution of the water vapor in the permeate. Thus the relative water vapor content and partial pressure of water vapor on the permeate side of the membrane skin surface will decrease with increasing sweep fluid flow rate. The purge ratio (sweep fluid flow to nonpermeate fluid flow) was varied between 10% and 40% and over a range of feed flow rates between 10 and 100 liters (STP) per minute. The outlet pressure of the permeate was in all cases maintained at 16 pisa.

EXAMPLE 2

In an alternative procedure, the feed gas was introduced into the bore side of the hollow fiber membranes and the sweep fluid was introduced on the exterior or shell side of the hollow fiber membranes. This mode of operation is known as the bore-side feed mode. The permeator of Example 1 was operated under conditions essentially identical to those of Example 1, except that the feed gas was introduced into the bore side of the permeator via port 12. The dehydrated nonpermeate exited at port 16, the sweep gas was introduced via port 2, and the water-enriched permeate exited at port 10. A 20% purge ratio was maintained. As in Example 1, a countercurrent flow pattern was maintained. The results of these experiments are those of Runs 1 to 5, inclusive, of Table I.

All results of the drying tests are summarized in Table I, wherein the flow rates of each stream are given in liters at standard temperature and pressure per minute, and the water vapor contents in each stream are given in parts per million by volume (ppmv). The results show that the gas dehydration performance is essentially equivalent whether shell side feed mode or a bore side feed mode of operation is employed. As shown by the experimental data recorded in this table, the method of this invention is highly effective for removal of water vapor from fluid gas streams, being capable of reducing the water vapor content to less than one ppm. From the data reported, the water vapor permeability is readily calculated by one skilled in the art and can be as high as 20 to 30 ft$^3$ (STP)/ft$^2$·psi·day. In a separate air separation experiment, the oxygen permeability for this permeator was found to be 0.017 ft$^3$(STP)/ft$^2$·psi·day, with an oxygen/nitrogen selectivity of about 7.0. The permeator thus exhibited an apparent $H_2O/O_2$ separation factor of about 1,500 and an apparent $H_2O/N_2$ separation factor of about 11,000.

reaction was allowed to continue for an additional two hours. The methylene chloride was decanted and the reddish-brown precipitate was washed 3 times with 2,000 cc of methlyene chloride for 15 minutes each at room temperature. The methylene chloride was decanted each time. The sulfonated polysulfone was dissolved in a solvent consisting of 1,000 cc of 2-propanol and 75 cc of deionized water. The gold-colored solution was rotary evaporated at 50° C. to dryness and the sulfonated product dialyzed. The dialyzate was rotoevaporated to dryness. The thus prepared sulfonated polysulfone (SPS) had a determined ion-exchange capacity of 1.95 meq/g of dry polymer in H+form.

Part B.

A composite sulfonated polysulfone (SPS) membrane was produced essentially as described in Example 1, Part B, except that the coating solution was prepared by dissolving 2 g of SPS polymer, prepared as in Part A of this example, in 100 cc of isopropyl alcohol/water mixture 90/10 by volume.

Part C. Preparation of Permeator Device

A helically wound hollow fiber membrane separation device was constructed in the same manner as described

TABLE I

| | FLOW RATE (a) | | | | WATER VAPOR CONTENT | | | |
|---|---|---|---|---|---|---|---|---|
| Run | Air* Feed | Sweep Fluid | Permeate | Non-permeate | Purge Ratio | Air Feed | Sweep Fluid | Permeate | Non-permeate |
| 1 | 80.8 | 16.1 | 16.4 | 80.5 | 0.20 | 2012 | 1 | 10087 | 11 |
| 2 | 60 | 12. | 12.3 | 59.7 | 0.20 | 2450 | 1 | 10087 | 3.7 |
| 3 | 40.6 | 8. | 8.3 | 40.3 | 0.20 | 2397 | 1 | 10226 | 1.3 |
| 4 | 30.3 | 6 | 6.3 | 30. | 0.20 | 2366 | 1 | 9982 | 0.7 |
| 5 | 20.4 | 4. | 4.4 | 20.4 | 0.20 | 2408 | 1 | 9950 | 0.8 |
| 6 | 10.4 | 2 | 2.4 | 10 | 0.20 | 2221 | 1 | 9417 | 0.8 |
| 7 | 20.3 | 4 | 4.3 | 20 | 0.20 | 2213 | 1 | 9842 | 2.4 |
| 8 | 10.3 | 2.1 | 2.4 | 10 | 0.21 | 2423 | 1 | 9434 | 0.6 |
| 9 | 30.3 | 6.1 | 6.4 | 30 | 0.20 | 2444 | 1 | 10114 | 1 |
| 10 | 40.3 | 8.1 | 8.3 | 40.1 | 0.20 | 2507 | 1 | 9910 | 2.4 |
| 11 | 10.2 | 1 | 1.3 | 9.9 | 0.10 | 2402 | 1 | 14131 | 165 |
| 12 | 20.5 | 2 | 2.4 | 20.1 | 0.10 | 2234 | 1 | 14713 | 320 |
| 13 | 30.4 | 3 | 3.4 | 30 | 0.10 | 2360 | 1 | 14422 | 341 |
| 14 | 10.6 | 1 | 1.4 | 10.2 | 0.10 | — | 1 | — | 202 |
| 15 | 30.4 | 16 | 16.4 | 80 | 0.20 | 2423 | 1 | — | 10 |
| 16 | 10.4 | 3.4 | 3 | 10 | 0.30 | — | 1 | — | 0.4 |
| 17 | 10.4 | 3 | 3.4 | 10 | 0.30 | 2402 | 1 | 7182 | 0.4 |
| 18 | 20.2 | 6 | 6.3 | 19.9 | 0.30 | 2381 | 1 | 7712 | 0.4 |
| 19 | 30.2 | 9 | 9.2 | 30 | 0.30 | 2381 | 1 | 7447 | 0.4 |
| 20 | 40.3 | 12.1 | 12.4 | 40 | 0.30 | 2381 | 1 | 7235 | 0.4 |
| 21 | 60.9 | 18.1 | 18.5 | 60.5 | 0.30 | 2114 | 1 | 7076 | 0.5 |
| 22 | | 24.3 | 22.4 | 80.6 | 0.30 | 2402 | 1 | 6922 | 1 |
| 23 | | 29.6 | 26.8 | 98 | 0.30 | 2339 | 1 | 6828 | 3.6 |
| 24 | 10.4 | 4 | 4.3 | 10.1 | 0.40 | 2465 | 1 | 5698 | 0.3 |
| 25 | 59.7 | 12.2 | 12.2 | 59.7 | 0.20 | — | 1 | — | — |
| 26 | 20.2 | 4.1 | 4.4 | 19.9 | 0.20 | — | 1 | — | 1 |

*Calculated from sweep, permeate, non-permeate mass balance.
(a) In liters (STP) per minute.

EXAMPLE 3

Part A. Preparation of Sulfonated Polyarylether Sulfone (SPS)

500 g of Udel 3500 (Amoco Performance Products), dried at 150° C. overnight, were dissolved in 2600 cc of methylene chloride in a 4-liter pyrex reaction kettle. The dissolved solution was cooled to <5° C. before adding the sulfonating agent, chlorosulfonic acid.

In a 500 ml additional funnel, 112 cc of chlorosulfonic acid were added to 388 cc of methylene chloride (20% V/V). The chlorosulfonic acid-methylene chloride solution was added to the Udel-methylene chloride solution over a period of 90 minutes. The cooling bath was removed after the addition time was completed and the in Example 1, except that the cartridge surface area was smaller and the composite hollow fibers of Part B of this example were used in the cartridge construction. The fibers had an outer diameter of 20.1 mils and an inner diameter of 12.9 mils. The cartridge contained 2.7 square feet of active membrane area. The composite sulfonated polysulfone (SPS) membrane was post-treated in a conventional manner except that a dilute solution of low molecular weight aminosilicone was utilized as a post-treating material prior to permeation experiments.

Part D. Operation of the Permeator

The permeator was operated under conditions identical to those of Example 1, except that the purge ratio was constant throughout the test and maintained at 20%. The air drying results are summarized as runs 1 and 2 in Table II. The water permeability is readily calculated from these data to be between 25 and 30 ft$^3$ (STP)/ft$^2$·psi·day In a separate air separation test, the oxygen permeability for this permeator was found to be 0.0047 ft$^3$ (STP)/ft$^2$·psi·day with H$_2$O//O$_2$ selectivity of 3.6. The apparent H$_2$O/O$_2$ selectivity was, therefore, about 6,000 and the apparent H$_2$O/N$_2$ selectivity was about 21,000.

TABLE II

Data of Example 3

| | | Flow Rate$^a$ | | | | Water Vapor Content (ppmv) | | |
|---|---|---|---|---|---|---|---|---|
| Run | Air* Feed | Sweep Fluid | Permeate | Non-permeate | Purge Ratio | Air Feed | Sweep Fluid | Permeate | Non-permeate |
| 1 | 15.9 | 3.18 | 3.18 | 15.9 | 0.20 | 2140 | 1 | 11,200 | 28 |
| 2 | 11.9 | 2.36 | 2.38 | 11.9 | 0.20 | 2220 | 1 | 11,200 | 14 |

$^a$In liters (STP) per minute.
*Calculated from sweep, permeate, and nonpermeate mass balance

What is claimed is:

1. In a fluids separation device having an annular hollow fiber membrane bundle enclosed in a shell containing a fluid feed entrance port, a nonpermeate exit port, a sweep fluid-permeate exit port and a sweep fluid entrance port, with tubesheets encapsulating both ends of said membrane bundle, and with a center core member extending or communicating through at least one of the tubesheets to permit the flow of fluid therethrough, said membrane bundle being in a cylindrical shape positioned in said shell around said center core member, with the hollow fibers therein extending essentially the whole length of the shell with both ends of the hollow fibers embedded in and extending through the tubesheet in a fluid tight relationship thereto, and with a fluid tight relationship between the shell and the bore side of said hollow fiber bundle, the improvement enabling enhanced fluid separation to be achieved in said four port device upon introduction of sweep gas therein during fluid separation operations comprising:

(a) said center core member comprising a center core tube having perforated holes in the wall thereof at a location close to one of the tubesheets, said holes providing fluid communication between the exterior surfaces of the hollow fibers and the interior of said center core tube;

(b) an essentially non-permeable film barrier encasing essentially the entire longitudinal length of the exposed hollow fibers in the bundle except for a non-encased circumferential region near the ned of the membrane bundle opposite the end where said holes are present, said film barrier being in intimate contact with the exterior surface of the membrane bundle so as to prevent fluid channeling such as to cause fluid to bypass the active surface areas of the hollow fiber membrane surfaces by the fluid stream passing thereover, said film barrier causing fluid on the shell side thereof to flow along the annular space between the shell and said impermeable film barrier, whereby said device enables a sweep fluid to be employed effectively without channeling and by-passing a portion of the hollow fibers in the bundle, enhancing the efficiency of the fluid separation operation.

2. A hollow fiber separation device as claimed in claim 1 further comprising seals located between the potting composition and the pressure resistant shell.

3. A fluids separation device as claimed in claim 1 for reducing the moisture content of air.

4. A fluids separation device as claimed in claim 1 for reducing the moisture content of natural gas.

5. A fluids separation device as claimed in claim 1 wherein said essentially nonpermeable film barrier comprises one or more layers of plastic film.

* * * * *